United States Patent [19]
Brown

[11] 3,821,438
[45] June 28, 1974

[54] METHOD FOR IMPARTING PINK COLOR TO CURED MEATS

[75] Inventor: William D. Brown, Davis, Calif.

[73] Assignee: The Regents of the University of California, Berkeley, Calif.

[22] Filed: June 28, 1972

[21] Appl. No.: 267,138

[52] U.S. Cl............. 426/266, 426/224, 426/265
[51] Int. Cl............................................. A23b 1/02
[58] Field of Search...... 99/157, 159; 426/224, 262, 426/264, 265, 266

[56] References Cited
UNITED STATES PATENTS

| | | | |
|---|---|---|---|
| 2,491,646 | 12/1949 | Coleman et al | 99/157 X |
| 2,863,777 | 12/1958 | Dekker | 99/157 |
| 3,597,236 | 8/1971 | Hopkins et al | 99/157 |
| 3,666,488 | 5/1972 | Nakao et al | 99/222 X |

Primary Examiner—Hyman Lord
Attorney, Agent, or Firm—Stanley Bialos

[57] ABSTRACT

Hexyl nicotinate or N,N-diethylnicotinamide are found to give a persistent pink color to cured meats either when employed alone or along with nitrite salts in amounts of about 10 to 20 ppm, while trigonelline or methyl nicotinate are found to be similarly useful when employed with like small amounts of the nitrite salts.

3 Claims, No Drawings

3,821,438

METHOD FOR IMPARTING PINK COLOR TO CURED MEATS

BACKGROUND OF THE INVENTION

Practically all cured meat products, including ham, bacon, sausages (including frankfurters) and the various luncheon meats, for example, derive their pink color from the addition of nitrite and/or nitrate salts which not only act to establish the pink color but also serve to protect the meat against spoilage. Inasmuch as any nitrate salts employed in the curing mixture are converted to nitrites in the meat product as a result of bacterial and chemical action, it will be understood that in referring hereinafter to the use of nitrite salts, the use of nitrate salts is also contemplated.

When curing meat products in the past, the practice has been to incorporate about 200 ppm of nitrite, thereby obtaining a lasting pink color in the cured meat and protecting it against spoilage. This color formation is attributable to a reaction in which nitric oxide formed on reduction of the nitrite establishes a stable derivative of the desired pink color with the myoglobin and other muscle pigments. However, while the color forming and the preservative action of the added nitrite is excellent, the practice of adding nitrites and/or nitrates to meat products is coming under increasing attack from a health standpoint, at least when the nitrite content exceeds about 20 ppm. At this low level the color forming action of the nitrite is unsatisfactory due to a lack of good stability or persistence of the pink color. From the health hazard standpoint, the concern of the Governmental and other agencies concerned is that the nitrite compounds may be converted in the gastrointestinal tract to carcenogenic nitrosamines.

It is an object of this invention to provide improved methods and compositions for curing meats which are capable of imparting a stable pink color to cured meat products without giving rise to any hazard to health and which thus can be used with safety. Another object is to provide curing compositions which may incorporate nitrites in such small amounts compared to the amounts now employed, such as to present no hazard to health, yet which are capable of providing a pink-colored cured meat product having enhanced resistance against spoilage attributable to the nitrite component. The nature of still other objects of the invention will be apparent from the descriptive portion to follow.

SUMMARY AND DESCRIPTION OF THE INVENTION

The present invention rests on the discovery that hexyl nicotinate and N,N-diethylnicotinamide are each capable of imparting a stable and highly persistent pink color to cured meat at relatively low concentrations when used as the sole color-forming agents or in curing compositions which are substantially free of nitrite salts, but which may be employed with small amounts (much less than amounts presently employed) of nitrite salts to enhance preservation and color stability. A further discovery is that trigonelline and methyl nicotinate are each similarly effective in producing said pink color in cured meats when employed with like small amounts of the nitrite salts. The latter apparently has a synergistic effect when employed in amounts not exceeding about 20 ppm and desirably about 10 to 20 ppm.

The amounts of the aforesaid color-forming additives to be used in carrying out the meat curing operations of the present invention will vary from one meat product to another, as well as with such factors as cooking temperatures and times and the manner in which the curing compounds are incorporated into the meat product. However, in general, said additives will be employed in amounts which are effective to provide the cured meat product with a stable and highly persistent pink color. While said amounts of the additives to be used can readily be determined for a given meat product by routine methods, good results can be obtained with a wide variety of cured meat products, including bacon, hams, sausage (including frankfurters) and luncheon meats, by employing a curing compostion containing a total of from about 0.05 to 5 per cent, in terms of the total weight of the cured meat composition, of the compounds hexyl nicotinate, N,N-diethylnicotinamide, methyl nicotinate and trigonelline, it being noted that the latter two compounds, and optionally the first two thereof, are employed along with a small amount of nitrite.

When a nitrite is to be added to the composition, it is added in amounts of from about 10 to about 20 parts by weight per million parts of the cured meat composition (10 to 20 ppm). This nitrite additive is normally comprised of sodium nitrite and/or sodium nitrate, though, somewhat less desirably, the equivalent potassium salts may also be used. Within this nitrite range the respective nitrite and the other additives recited above reinforce one another as regards to the stability and persistence of the pink color in the cured meats. At the same time, the meat products are provided with an amount of the nitrite which serves to exert an appreciable preservative effect on said products.

In a preferred embodiment of the present invention, the curing composition employed therein also incorporates a reductant such as ascorbic or isoascorbic acid (erythorbic) acid, or a sodium or potassium salt of said acids. These reductants, collectively termed "ascorbate" herein, can be employed with good effect in amounts of from about 0.02 to about 0.1 percent, based on the weight of the cured meat product. This ascorbate acts in part by increasing the efficiency of the nitrite, though at the same time it acts to reduce metmyoglobin to myoglobin and thus to acccelerate the overall reaction of curing and impart the desired pink color.

Other ingredients of the curing composition which may be employed in a practice of this invention include sodium chloride, various sugars as sweetening agents, spices and flavorings, and other usual additives such as acetic acid and glucono-delta-lactone, for example.

The color-forming additives referred to above, along with the other components of the curing composition, can be incorporated into the meat product in any desired fashion. Thus, with sausages and the like, the curing components are added to one or the other of the sausage components for thorough admixing with the other components as the mass is ground together. Again, the curing composition can be applied to the meat piece externally either in the form of a dry rub or in the form of a cover pickle. Internal injection means, as by vascular system or stitch pumping, for example, can also be employed.

DESCRIPTION OF THE PREFERRED EMBODIMENTS

The following examples are illustrative of the invention but are not to be construed as limiting.

EXAMPLE 1

In this sausage mixing and curing procedure, N,N-diethylnicotinamide is incorporated in the sausage batch as the sole color forming additive, it being used in three concentration levels in otherwise similar operations. The sausage was compounded as follows:

Meat (equal parts of lean ground beef and pork) 76 percent; sodium chloride 2 percent; sucrose 1.5 percent; ascorbic acid 0.05 percent; N,N-diethylnicotinamide 0.05, 0.3 or 1.1 percent; and the usual ice water to make up to 100 percent.

In working up the above mixture into frankfurters, the salt, sugar and N,N-diethylnicotinamide are added to one half of the water and the beef and pork are mixed in. The mixture is then ground in an electric mixer having a meat grinder attachment, the diameter of the opening being 1 × 1.5 cm. The mixture is then ground with the ascorbic reductant as placed in solution with the remaining water. The preparation is then stuffed into 35 ml disposable plastic syringes having one end cut off, and a plastic stopper is used to cover the cut end and thus enclose the sausage composition. The frankfurters are then cooked for 2 hours in a water bath, some at 70° C. and the others at 94° C. The samples are immediately cooled with ice while still in the syringes and stored in a refrigerator for several days. The material is then removed from the syringes and allowed to stand in the atmosphere for 24 hrs. In each case it is found that the typical pink color of cured meats is developed with cooking. Further, the stability of the pigment, once formed, is highly acceptable. These sausage type products, on being removed from the syringes and held in the air, are found to hold their color remarkably well.

EXAMPLE 2

The operation of Example 1 is repeated, but with the use of sausage formulations containing 0.05 and 0.5 percent of hexyl nicotinate, respectively, as the sole color forming additive. In all cases there are obtained frankfurter products wich manifest the desired pink coloration both on cooking as well as after long storage and a following period of exposure to the atmosphere.

EXAMPLE 3

Examples 1 and 2 are repeated, but with the further addition of 20 ppm of sodium nitrite to each sausage batch. The appearance of the resulting sausages is little different than that of said examples; however, the presence of the residual nitrite in the product is found to contribute a significant preservative effect.

EXAMPLE 4

Example 1 is repeated, but with sausage formulations in which the color forming additive employed in one case is 0.5 percent trigonelline, in another case is 20 ppm sodium nitrite, and in the third case is 0.5 percent trigonelline and 20 ppm sodium nitrite. It is found that those sausages prepared with only trigonelline display little if any coloration on cooking, while those prepared with only the sodium nitrite, while initially pink, no longer have a satisfactory color after being stored and exposed to the atmosphere. On the other hand, those sausages containing both the trigonelline and the nitrite display excellent coloration which persists through storage and atmospheric exposure. It is evident that the trigonelline acts in some way, as yet not understood, to stabilize the good color which is initially obtained on using the nitrite alone.

The foregoing tests are found to give substantially the same results when repeated, but with the use of 10 rather than 20 ppm of sodium nitrite.

EXAMPLE 5

The operation of Example 4 is repeated, but with the use of methyl nicotinate instead of trigonelline, the methyl nicotinate being used at concentrations of both 0.05 and 0.1 percent, along with 20 ppm of sodium nitrite in one series of tests, and with 10 ppm of sodium nitrite in another test series. In every instance the sausage product is found to display an excellent pink coloration after cooking and after storage and exposure to the atmosphere. Here, as with the other operations wherein the nitrite is used, the sausage is characterized by improved resistance against spoilage.

All the ligands disclosed herein are chemicals which are readily available in the marketplace. They have the following chemical structures:

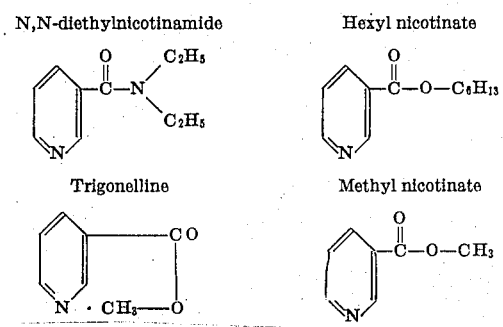

From the preceding it will be seen that the particular pink color producing additives hereof are in effect substitutes for relatively large amounts of nitrite salts above about 20 ppm. Thus, they obviate the hazard of toxicity in the use of such relatively large amounts of nitrite salts.

The hexyl nicotinate and the N,N-diethylnicotinamide need not be used with nitrite salts to obtain a stable pink color, while the methyl nicotinate and trigonelline when used with relatively small amounts (about 10 to 20 ppm) of nitrite salts produce a stable pink color.

Certain of the color-forming additives recited herein have unique properties which distinguish them from homologous compounds. Thus, hexyl nicotinate is somewhat oily and has limited solubility in water. However, its effectiveness in low concentrations makes it possible to use the compound in low concentrations and thus avoid solubility problems. Thus, in cured meat systems it forms an emulsion and distributes itself between the water soluble and fat soluble systems. This leads to the ideal situation in terms of maximum distribution throughout the system and to maximum pigment formation.

Trigonelline, otherwise known as nicotinicmethylbetaine, has the unique characteristic of not being converted to nicotinic acid in the body system and of thus passing through the human metabolic system unchanged.

I claim:

1. A method of curing meat products in which the resulting cured meat product possesses a stable pink color, said method comprising treating the meat product to be cured with a curing composition containing at least one pink color-producing compound selected from the group consisting of hexyl nicotinate, N,N-diethylnicotinamide and trigonelline, the amount of any such color-producing compound employed being such as to provide the cured meat product with about 0.05 to 5 weight percent of said compound, the curing composition, when containing trigonelline as a color forming ingredient also containing nitrite salts present in an amount such as to provide the cured meat product with from about 10 to about 20 ppm thereof.

2. The method of claim 1 wherein the curing composition also contains ascorbate present in an amount such as to provide the cured meat product with from about 0.2 to 0.1 weight percent thereof.

3. The method of claim 2 wherein the curing composition contains nitrite salts in an amount sufficient to provide the cured meat product with from about 10 to about 20 ppm thereof, when hexyl nicotinate or N,N-diethylnicotinamide is present as a color forming ingredient.

* * * * *